(12) United States Patent
West

(10) Patent No.: US 10,766,386 B1
(45) Date of Patent: Sep. 8, 2020

(54) FOLDABLE INTEGRATED CHILD CAR SEAT APPARATUS

(71) Applicant: Annie West, Richland, GA (US)

(72) Inventor: Annie West, Richland, GA (US)

( * ) Notice: Subject to any disclaimer, the term of this patent is extended or adjusted under 35 U.S.C. 154(b) by 0 days.

(21) Appl. No.: 16/387,631

(22) Filed: Apr. 18, 2019

(51) Int. Cl.
*B60N 2/30* (2006.01)
*B60N 2/26* (2006.01)

(52) U.S. Cl.
CPC .......... *B60N 2/3084* (2013.01); *B60N 2/265* (2013.01)

(58) Field of Classification Search
None
See application file for complete search history.

(56) References Cited

U.S. PATENT DOCUMENTS

| | | | |
|---|---|---|---|
| 4,533,176 A | 8/1985 | Wyttenbach | |
| 4,540,216 A * | 9/1985 | Hassel, Sr. | B60N 2/3084 297/112 |
| 5,100,199 A * | 3/1992 | Vander Stel | A61K 31/155 297/238 |
| 5,498,062 A * | 3/1996 | Holdampf | B60N 2/3084 297/14 |
| 5,609,392 A | 3/1997 | Stigson | |
| 5,647,634 A * | 7/1997 | Presser | B60N 2/2878 297/238 |
| 5,806,926 A | 9/1998 | Parsons | |
| 7,070,239 B1 * | 7/2006 | Ugrekhelidze | B60N 2/3084 297/105 |
| 7,517,016 B1 * | 4/2009 | West | B60N 2/832 297/236 |
| 2006/0006712 A1 * | 1/2006 | Clement | B60N 2/2878 297/238 |
| 2008/0100109 A1 | 5/2008 | Frank | |
| 2009/0051188 A1 | 2/2009 | Foussianes | |
| 2014/0084651 A1 | 3/2014 | Coman | |
| 2015/0130235 A1 * | 5/2015 | Herut | B60N 2/2878 297/238 |

* cited by examiner

Primary Examiner — David E Allred

(57) ABSTRACT

A foldable integrated child car seat apparatus for eliminating the need to install and remove a child car seat includes a main seat back coupled to a main seat base. A front side of a back cushion of the main seat back has a storage cavity. A child seat back is slidingly coupled to the storage cavity to slide between a forward position and an alternate stored position adjacent a back face of the storage cavity. A child seat bottom is pivotably coupled to the child seat back to move between an open position and an alternate folded position adjacent the child seat back. A cover plate is coupled to the child seat bottom and conforms to a profile of the storage cavity such that with the child seat back in the stored position and the child seat bottom in the folded position the cover plate covers the storage cavity.

12 Claims, 6 Drawing Sheets

FOLDABLE INTEGRATED CHILD CAR SEAT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to car seats and more particularly pertains to a new car seat for eliminating the need to install and remove a child car seat.

BRIEF SUMMARY OF THE INVENTION

An embodiment of the disclosure meets the needs presented above by generally comprising a main seat base having a platform and a bottom cushion coupled to the platform. The platform is configured to be installed in a vehicle. A main seat back is coupled to the main seat base. The main seat back has a back cushion and a headrest coupled to a top side of the back cushion. A front side of the back cushion has a storage cavity extending towards a back side of the back cushion from a bottom edge of the back cushion to proximal the top side and from proximal a left edge to proximal a right edge of the back cushion. A child seat back is coupled to the main seat back. The child seat back is slidingly coupled to each of a right face and a left face of the storage cavity to slide between a forward position proximal the front side of the back cushion and an alternate stored position adjacent a back face of the storage cavity. A child seat bottom is pivotably coupled to a bottom side of the child seat back to move between an open position and an alternate folded position adjacent the child seat back. A seat belt is coupled to the child seat back. A belt receptacle is coupled to the child seat bottom. The belt receptacle selectively receives the seat belt. A cover plate is coupled to the child seat bottom. An inner side of the cover plate is coupled to an underside of the child seat bottom and conforms to a profile of the storage cavity such that with the child seat back in the stored position and the child seat bottom in the folded position, the cover plate covers the storage cavity and an outer side is flush with the front side of the back cushion.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
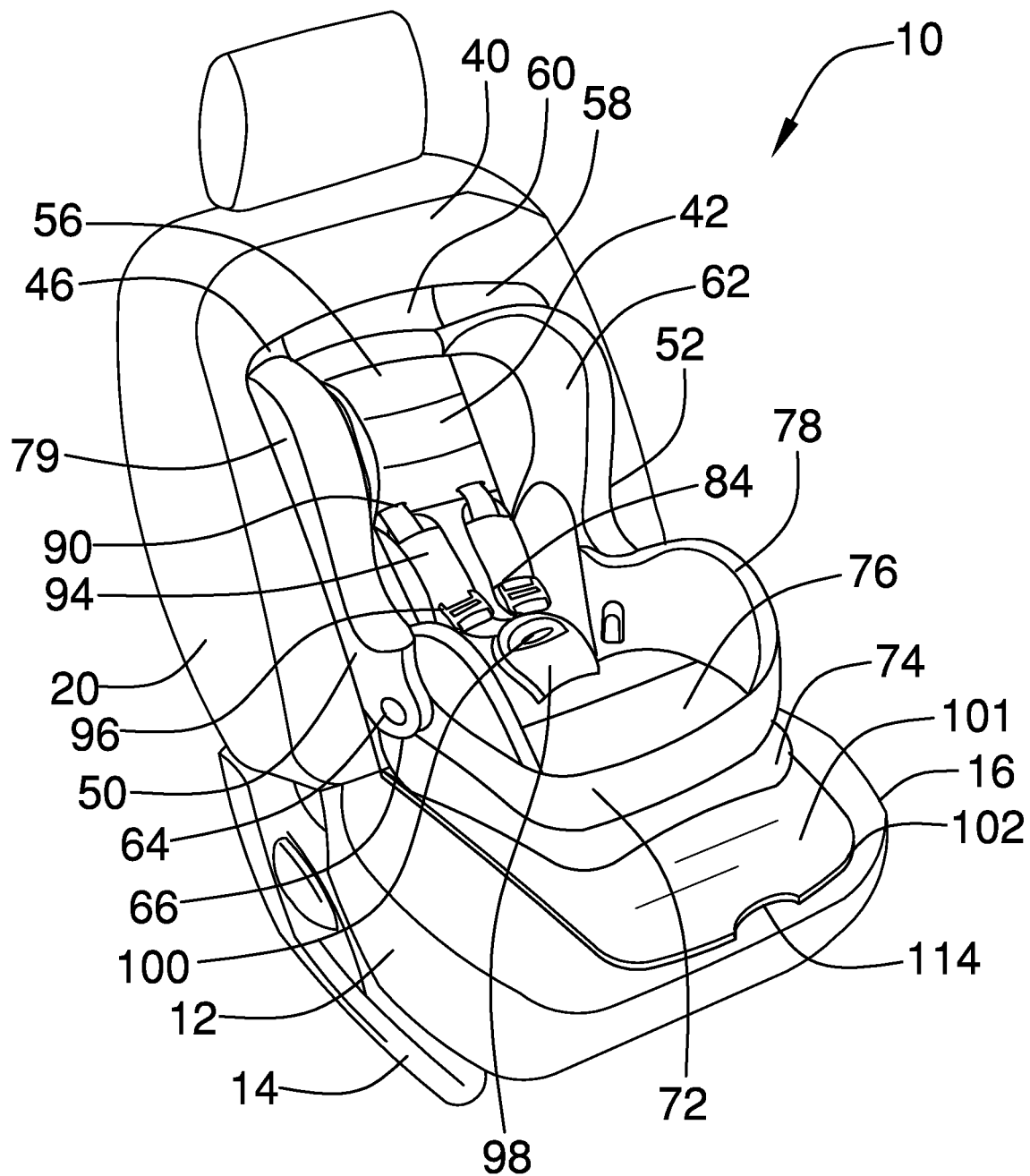
FIG. 1 is an isometric view of a foldable integrated child car seat apparatus according to an embodiment of the disclosure.
Figure 2:
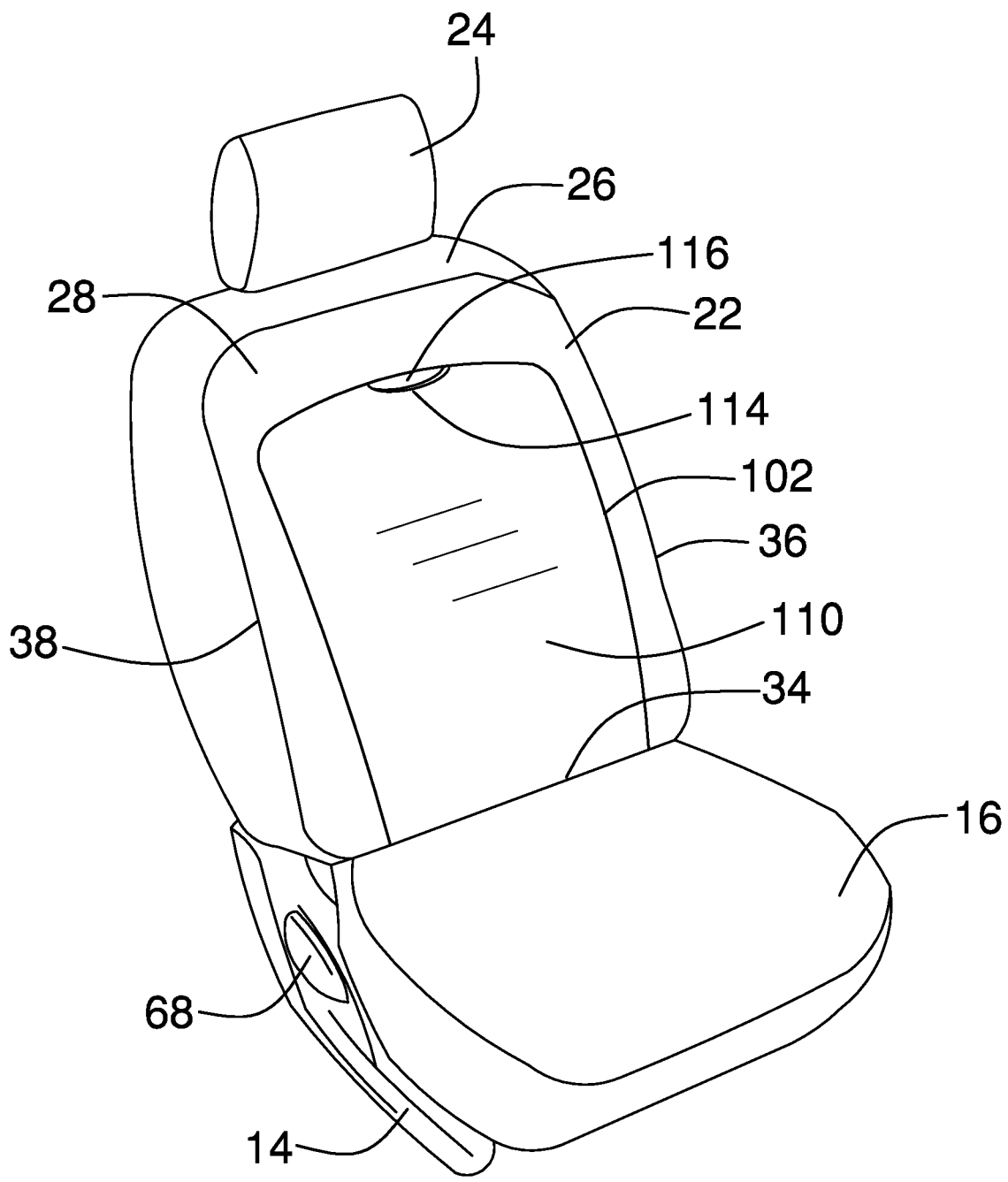
FIG. 2 is an isometric view of an embodiment of the disclosure.
Figure 3:
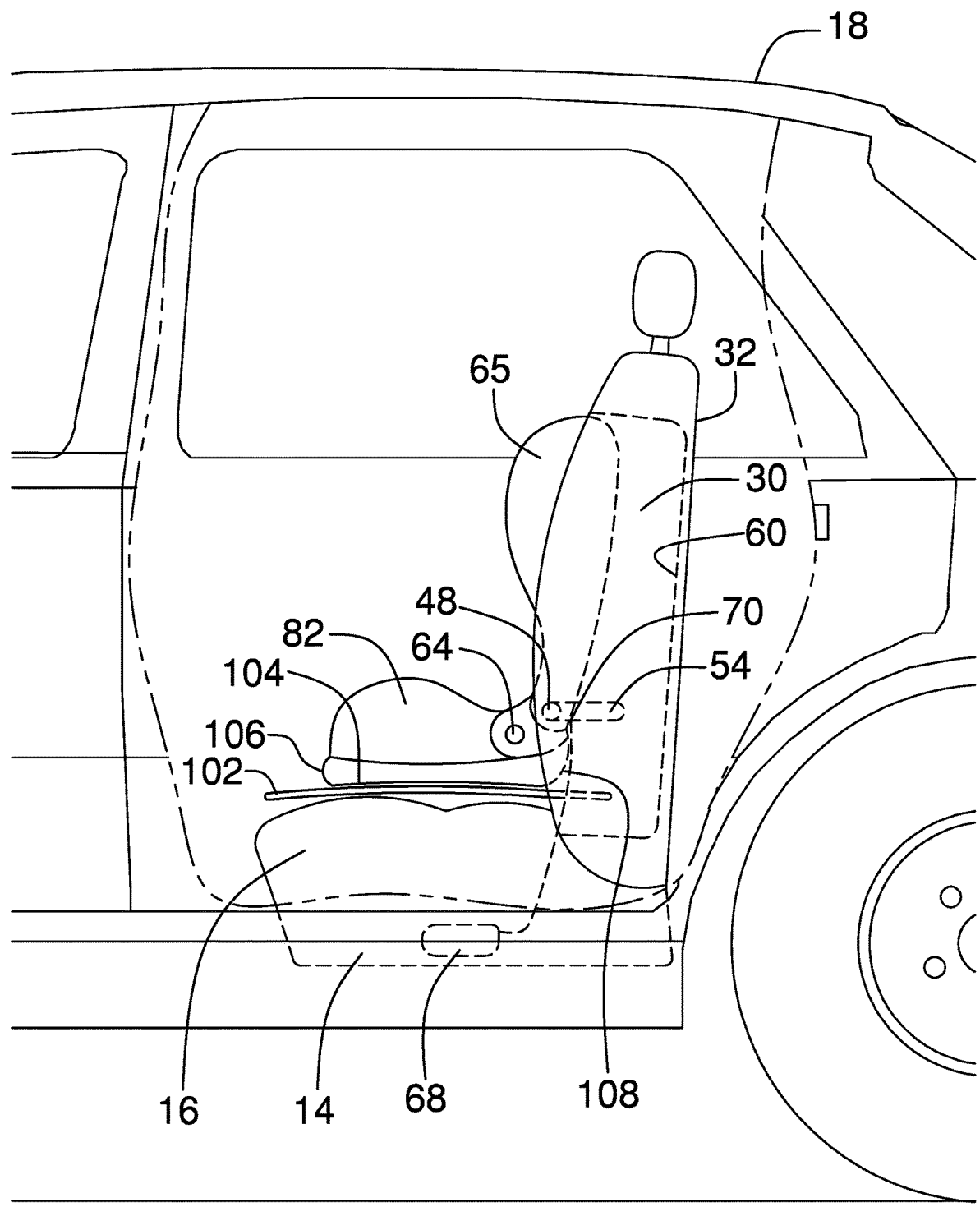
FIG. 3 is a side elevation view of an embodiment of the disclosure.
Figure 4:
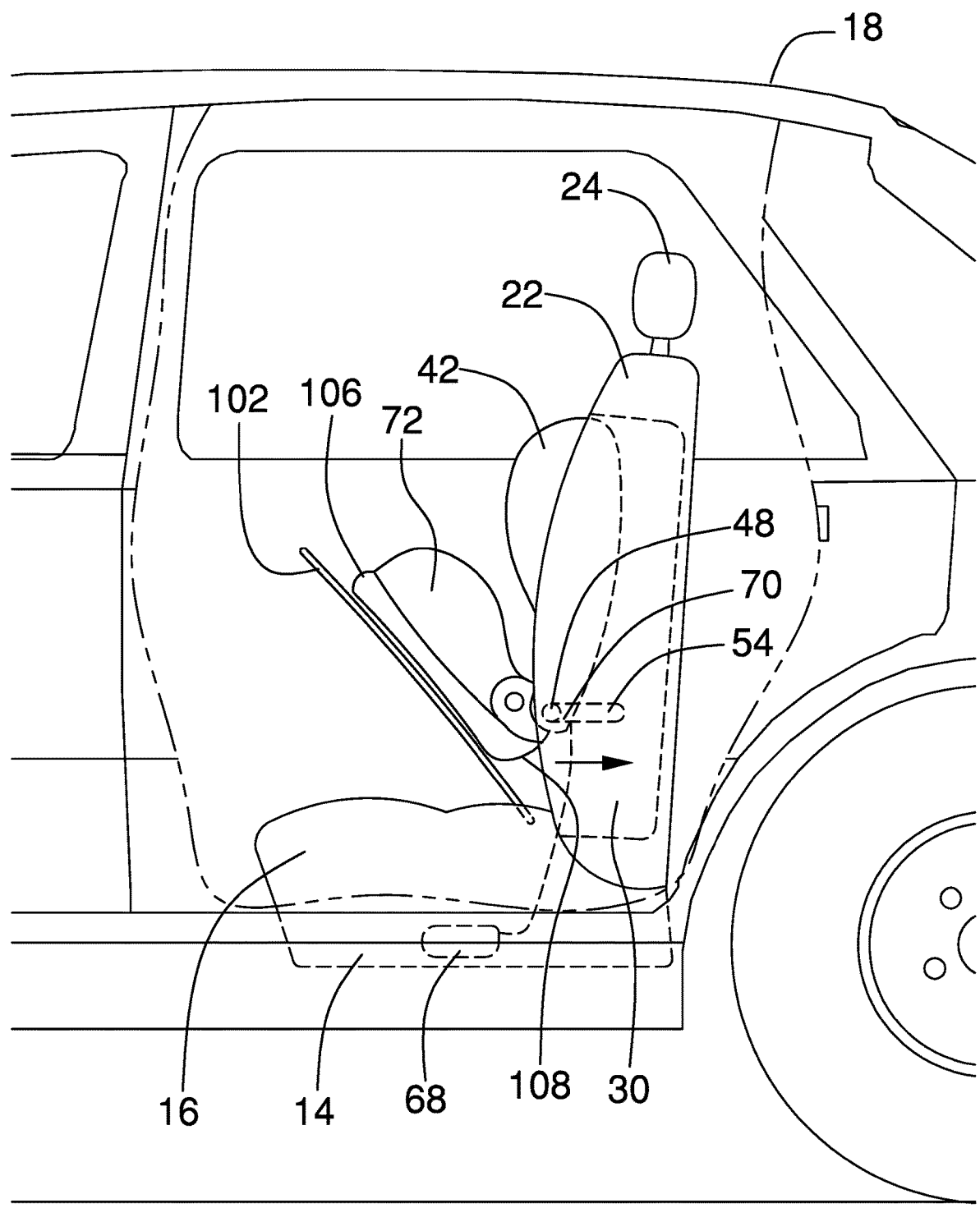
FIG. 4 is a side elevation in-use view of an embodiment of the disclosure.
Figure 5:
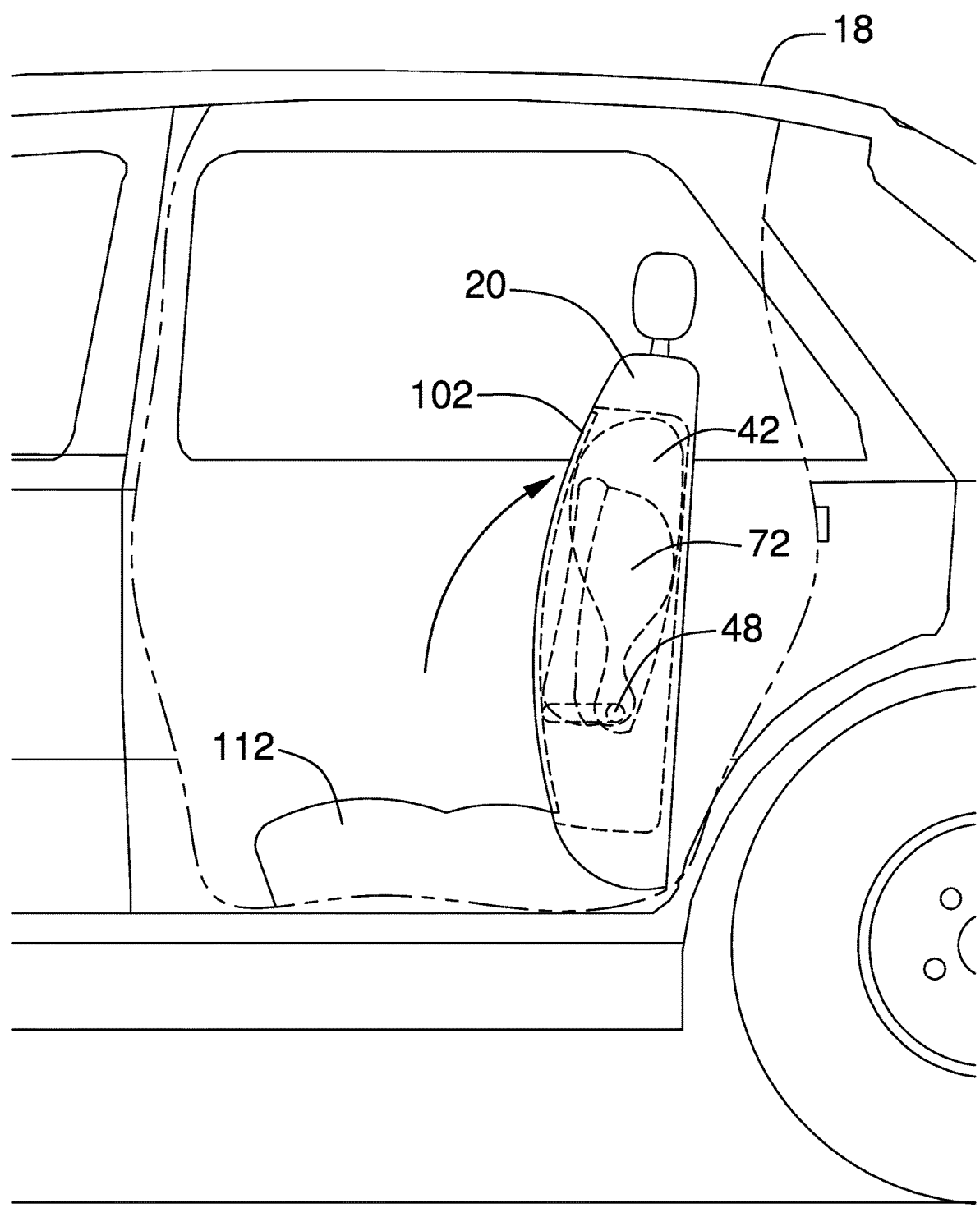
FIG. 5 is a side elevation in-use view of an embodiment of the disclosure.
Figure 6:
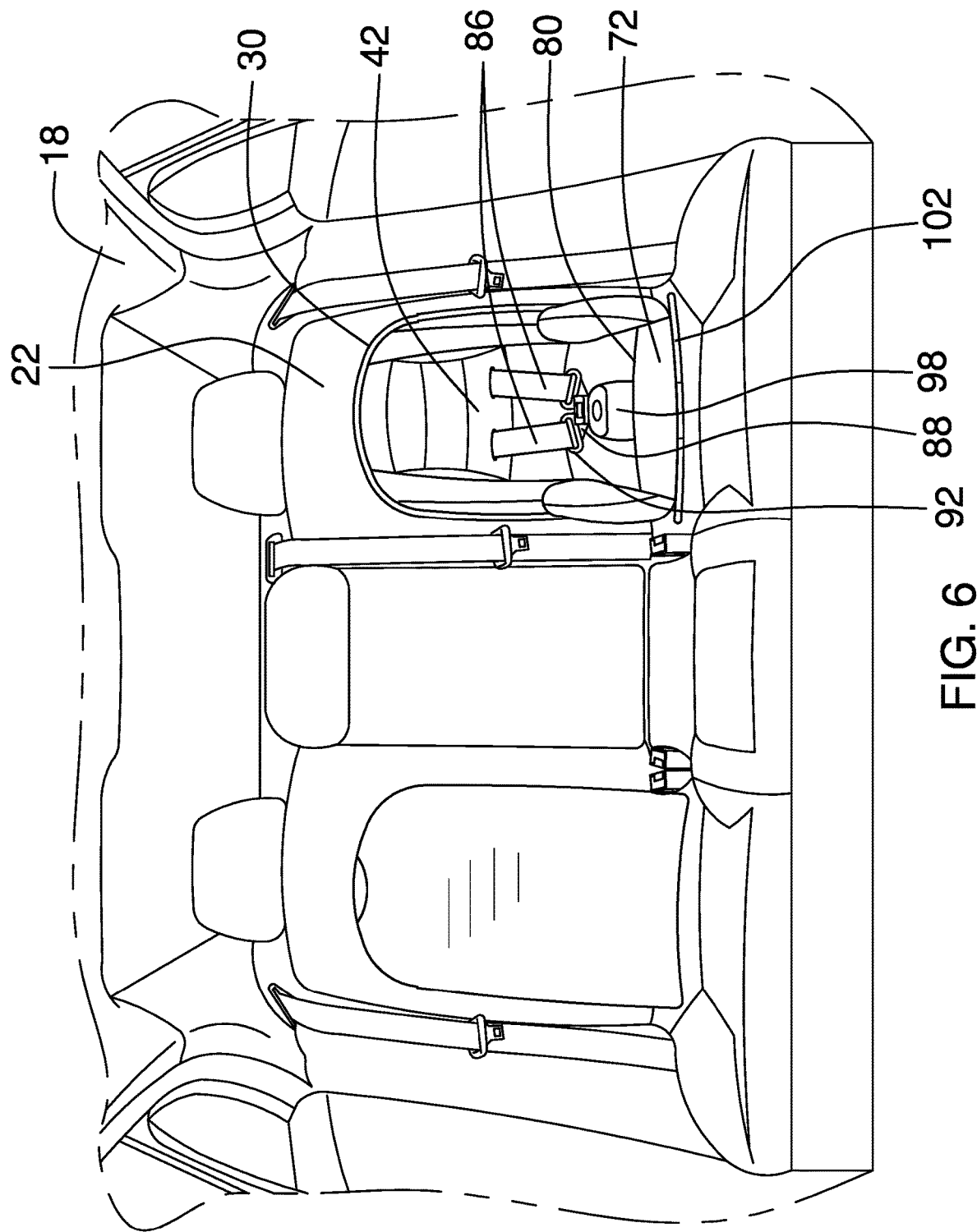
FIG. 6 is a front elevation view of an embodiment of the disclosure.

With reference now to the drawings, and in particular to FIGS. 1 through 6 thereof, a new car seat embodying the principles and concepts of an embodiment of the disclosure and generally designated by the reference numeral 10 will be described.

As best illustrated in FIGS. 1 through 6, the foldable integrated child car seat apparatus 10 generally comprises a main seat base 12 having a platform 14 and a bottom cushion 16 coupled to the platform 14. The platform 14 is configured to be installed in a vehicle 18. The bottom cushion 16 may be slidable along the platform 14 to adjust position within the vehicle 18. A main seat back 20 is coupled to the main seat base 12 and may be pivotably adjustable to adjust the recline angle. The main seat back 20 has a back cushion 22 and a headrest 24 coupled to a top side 26 of the back cushion. A front side 28 of the back cushion has a storage cavity 30 extending towards a back side 32 of the back cushion from a bottom edge 34 of the back cushion to proximal the top side 26 and from proximal a left edge 36 to proximal a right edge 38 of the back cushion. The front side 28 thus has an inverted U-shape perimeter 40 around the storage cavity 30.

A child seat back 42 has an upper frame 44 coupled to the main seat back 20 and an upper cushion 46 coupled to the upper frame 44. The child seat back 42 has a pair of perpendicular pins 48 coupled to a right side 50 and a left side 52 of the upper frame. Each of the pair of pins 48 may have a circular profile. The pair of pins 48 is slidingly coupled within a pair of channels 54 within a right face 56 and a left face 58 of the of the storage cavity to slide between a forward position proximal the front side 28 of the back cushion and an alternate stored position adjacent a back face 60 of the storage cavity. The child seat back 42 has a pair of upper wing extensions 62 each having an extended, rounded, upper lobe 65 to laterally protect a user's neck and a hinge 64 adjacent a rounded bottom end 66. A release handle 68 coupled to the platform 14 of the main seat base is in operational communication with a catch mechanism 70 of the pair of channels 54 to allow the pair of pins 48 to slide from the forward position to the stored position in order to prevent undesired sliding while driving.

A child seat bottom 72 is coupled to the child seat back 42. The child seat bottom 72 has a lower frame 74 and a lower cushion 76 coupled to the lower frame 74. The child seat bottom 72 has a pair of lower wing extensions 78 pivotably coupled to the hinge 64 of each of the pair of upper wing extensions. The child seat bottom 72 thus pivots along a bottom side 80 of the child seat back 42 to move between an open position and an alternate folded position adjacent the child seat back. Each of the pair of lower wing extensions 78 has an extended, rounded frontal lobe 82 that fits within the pair of upper wing extensions 78 with the child seat bottom 72 in the folded position. A length of the child seat bottom 72 is less than a length of the child seat back 42.

A seat belt 84 comprises a pair of straps 86 and a clip 88. Each strap 86 is coupled to the upper frame 44 and extends through a pair of belt slots 90 of the upper cushion and is coupled to a pair of loops 92 of the clip. Each of the pair of straps 86 has a pad 94 and an adjustment mechanism 96. A belt receptacle 98 is coupled to the child seat bottom 72 and selectively receives the clip 88 of the seat belt. The belt receptacle 98 is flexibly coupled to the lower frame 74 and extends through the lower cushion 76. The belt receptacle 98 has an ejection button 100 to release the clip 88.

An inner side 101 of a cover plate 102 is coupled to an underside 104 of the lower frame 74 of the child seat bottom. The cover plate 102 extends past both a front edge 106 and a rear edge 108 of the child seat bottom. The cover plate 102 conforms to a profile of the storage cavity 30 such that with the child seat back 42 in the stored position and the child seat bottom 72 in the folded position the cover plate 102 covers the storage cavity 30 and an outer side 110 is flush with the front side 28 of the back cushion. The outer side 110 is cushioned to match with the back cushion 22. A top edge 112 of the cover plate may be rounded and has a curved cutout 114. The cutout 114 and the storage cavity 30 define an opening aperture 116 from which a user can pull the cover plate 102 to move the child seat bottom 72 from the folded position to the open position.

In use, the user secures the cover plate 102 through the opening aperture 116 to fold the child seat bottom 72 down to the open position and then pulls the child seat back 42 to the forward position. A child may then be secured by the seat belt 84 as in a traditional child car seat. For an adult to occupy the apparatus 10, the release handle 68 is pulled to free the catch mechanism 70 of the pair of channels 54 to slide the child seat back 42 to the stored position. The child seat bottom 72 may then be folded up into the folded position with the cover plate 102 sealing the storage cavity 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A foldable integrated child car seat apparatus comprising:
    a main seat base, the main seat base having a platform and a bottom cushion coupled to the platform, the platform being configured to be installed in a vehicle;
    a main seat back coupled to the main seat base, the main seat back having a back cushion and a headrest coupled to a top side of the back cushion, a front side of the back cushion having a storage cavity extending towards a back side of the back cushion from a bottom edge of the back cushion to proximal the top side and from proximal a left edge to proximal a right edge of the back cushion;
    a child seat back coupled to the main seat back, the child seat back being slidingly coupled to each of a right face and a left face of the storage cavity to slide between a forward position proximal the front side of the back cushion and an alternate stored position adjacent a back face of the storage cavity, the child seat back having a pair of perpendicular pins coupled to a right side and a left side, the pair of pins being slidingly coupled within a pair of fore and aft elongate channels within the right face and the left face, respectively, of the storage cavity;
    a child seat bottom coupled to the child seat back, the child seat bottom being pivotably coupled to a bottom side of the child seat back to move between an open position and an alternate folded position adjacent the child seat back;
    a seat belt coupled to the child seat back;
    a belt receptacle coupled to the child seat bottom, the belt receptacle selectively receiving the seat belt; and
    a cover plate coupled to the child seat bottom, an inner side of the cover plate being coupled to an underside of the child seat bottom and conforming to a profile of the storage cavity such that with the child seat back in the stored position and the child seat bottom in the folded position the cover plate covers the storage cavity and an outer side is flush with the front side of the back cushion.

2. The foldable integrated child car seat apparatus of claim 1 further comprising a top edge of the cover plate having a cutout, the cutout and the storage cavity defining an opening aperture from which a user can pull the cover plate to move the child seat bottom from the folded position to the open position.

3. The foldable integrated child car seat apparatus of claim 2 further comprising the cutout being curved.

4. The foldable integrated child car seat apparatus of claim 1 further comprising each of the pair of pins having a circular profile.

5. The foldable integrated child car seat apparatus of claim 1 further comprising a release handle coupled to the main seat base, the release handle being in operational communication with the pair of channels to allow the pair of pins to slide from the forward position to the stored position.

6. The foldable integrated child car seat apparatus of claim 1 further comprising the child seat back having a pair of upper wing extensions, each of the pair of upper wing extensions having a hinge adjacent a rounded bottom end, the child seat bottom being coupled to the hinge of each of the pair of upper wing extensions.

7. The foldable integrated child car seat apparatus of claim 6 further comprising the child seat bottom having a pair of lower wing extensions, the pair of lower wing extensions fitting inside the pair of upper wing extensions with the child seat bottom in the folded position.

8. The foldable integrated child car seat apparatus of claim 1 further comprising the child seat back having an upper frame and an upper cushion coupled to the upper frame, the child seat bottom having a lower frame and a lower cushion coupled to the lower frame.

9. The foldable integrated child car seat apparatus of claim 1 further comprising the seat belt comprising a pair of straps and a clip, each strap being coupled to the upper frame and extending through a pair of belt slots of the upper cushion and being coupled to a pair of loops of the clip, each of the pair of straps having a pad and an adjustment mechanism, the clip being selectively engageable with the belt receptacle, the belt receptacle being flexibly coupled to the lower frame and extending through the lower cushion, the belt receptacle having an ejection button to release the clip.

10. The foldable integrated child car seat apparatus of claim 1 further comprising a length of the child seat bottom being less than a length of the child seat back, the cover plate extending past both a front edge and a rear edge of the child seat bottom.

11. The foldable integrated child car seat apparatus of claim 1 further comprising the outer side of the cover plate being cushioned.

12. A foldable integrated child car seat apparatus comprising:
  a main seat base, the main seat base having a platform and a bottom cushion coupled to the platform, the platform being configured to be installed in a vehicle;
  a main seat back coupled to the main seat base, the main seat back having a back cushion and a headrest coupled to a top side of the back cushion, a front side of the back cushion having a storage cavity extending towards a back side of the back cushion from a bottom edge of the back cushion to proximal the top side and from proximal a left edge to proximal a right edge of the back cushion;
  a child seat back coupled to the main seat back, the child seat back having an upper frame and an upper cushion coupled to the upper frame, the child seat back having a pair of perpendicular pins coupled to a right side and a left side of the upper frame, the pair of pins being slidingly coupled within a pair of fore and aft elongate channels within a right face and a left face of the of the storage cavity to slide between a forward position proximal the front side of the back cushion and an alternate stored position adjacent a back face of the storage cavity, each of the pair of pins having a circular profile, the child seat back having a pair of upper wing extensions, each of the pair of upper wing extensions having a hinge adjacent a rounded bottom end;
  a release handle coupled to the main seat base, the release handle being in operational communication with the pair of channels to allow the pair of pins to slide from the forward position to the stored position;
  a child seat bottom coupled to the child seat back, the child seat bottom having a lower frame and a lower cushion coupled to the lower frame, the child seat bottom having a pair of lower wing extensions pivotably coupled to the hinge of each of the pair of upper wing extensions to move between an open position and an alternate folded position adjacent the child seat back, the pair of lower wing extensions fitting inside the pair of upper wing extensions with the child seat bottom in the folded position, a length of the child seat bottom being less than a length of the child seat back;
  a seat belt coupled to the child seat back, the seat belt comprising a pair of straps and a clip, each strap being coupled to the upper frame and extending through a pair of belt slots of the upper cushion and being coupled to a pair of loops of the clip, each of the pair of straps having a pad and an adjustment mechanism;
  a belt receptacle coupled to the child seat bottom, the belt receptacle selectively receiving the clip of the seat belt, the belt receptacle being flexibly coupled to the lower frame and extending through the lower cushion, the belt receptacle having an ejection button to release the clip; and
  a cover plate coupled to the child seat bottom, an inner side of the cover plate being coupled to an underside of the lower frame of the child seat bottom, the cover plate extending past both a front edge and a rear edge of the child seat bottom, the cover plate conforming to a profile of the storage cavity such that with the child seat back in the stored position and the child seat bottom in the folded position the cover plate covers the storage cavity and an outer side is flush with the front side of the back cushion, the outer side being cushioned, a top edge of the cover plate having a curved cutout, the cutout and the storage cavity defining an opening aperture from which a user can pull the cover plate to move the child seat bottom from the folded position to the open position.

\* \* \* \* \*